United States Patent
Roberts et al.

(10) Patent No.: US 6,496,222 B1
(45) Date of Patent: *Dec. 17, 2002

(54) DIGITAL CAMERA WITH MEMORY FORMAT INITIALIZATION

(75) Inventors: Marc K. Roberts, Burke, VA (US); Matthew A. Chikosky, Springfield, VA (US); Jerry A. Speasl, Vienna, VA (US)

(73) Assignee: St. Clair Intellectual Property Consultants, Inc., Grosse Pointe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,375

(22) Filed: Nov. 27, 2000

Related U.S. Application Data

(63) Continuation of application No. 09/253,831, filed on Feb. 19, 1999, now Pat. No. 6,233,010, which is a continuation of application No. 08/712,493, filed on Sep. 11, 1996, which is a continuation of application No. 08/098,787, filed on Jul. 29, 1993, now Pat. No. 5,576,757, which is a continuation of application No. 07/878,603, filed on May 5, 1992, now abandoned, which is a continuation of application No. 07/615,848, filed on Nov. 20, 1990, now Pat. No. 5,138,459.

(51) Int. Cl.[7] .................................................. H04N 5/76
(52) U.S. Cl. ........................ 348/231; 348/220; 348/207
(58) Field of Search ................................ 348/207, 220, 348/221, 222, 231, 232, 233, 373; 386/117, 118; H04N 5/225

(56) References Cited

U.S. PATENT DOCUMENTS

| | | |
|---|---|---|
| 4,074,324 A | 2/1978 | Barrett |
| 4,118,687 A | 10/1978 | McWaters et al. |
| 4,131,919 A | 12/1978 | Lloyd et al. |
| 4,167,022 A | 9/1979 | Dischert et al. |
| 4,385,361 A | 5/1983 | Moates |

(List continued on next page.)

FOREIGN PATENT DOCUMENTS

| | | |
|---|---|---|
| DE | 3809677 A1 | 3/1988 |
| EP | 0105213 A2 | 4/1984 |
| EP | 90303076.5 | 3/1990 |
| EP | 0371961 A2 | 6/1990 |
| EP | 0218291 B1 | 3/1991 |

(List continued on next page.)

OTHER PUBLICATIONS

Izawa et al.*
EIKONIX (Sep. 29, 1988).*
"Camera Stores Images On Chips", Laser Focus World, Apr. 1990, pp. 72, 74 and 75.
"Should I Sell Now? Follow the Trends", CompuServe Magazine, at 30 (Nov. 1991), Robert Cullen.
"Apple Planning to Announce 68030 Version of MacII", Info World, vol. 10, No. 38 (Sep. 5, 1988), Laurie Flynn, et al.
"Digital Card Camera", ITEJ Technical Report, vol. 14, No. 5, at 7 (Jan. 1990), Fujimori et al. (no translation).
"Graphics Formats", Byte, at 305 (Sep. 1989), Gerald L. Graef.
"Directory Assistance", Byte, at 327 (Jun. 1989), Rick Grehan.

(List continued on next page.)

*Primary Examiner*—Tuan Ho
(74) *Attorney, Agent, or Firm*—Harness, Dickey & Pierce, P.L.C.

(57) ABSTRACT

A digital camera includes a digital memory system having a control unit for checking for proper format initialization of a removable digital memory element and for performing format initialization of the memory element when necessary.

12 Claims, 11 Drawing Sheets

U.S. PATENT DOCUMENTS

| | | |
|---|---|---|
| 4,420,773 A | 12/1983 | Toyoda et al. |
| 4,453,268 A | 6/1984 | Britt |
| 4,456,931 A | 6/1984 | Toyoda et al. |
| 4,541,021 A | 9/1985 | Konishi et al. |
| 4,571,638 A | 2/1986 | Schneider et al. |
| 4,577,239 A | 3/1986 | Sougen |
| 4,587,633 A | 5/1986 | Wang et al. |
| 4,614,977 A | 9/1986 | Kawahara et al. |
| 4,641,203 A | 2/1987 | Miller |
| 4,656,524 A | 4/1987 | Norris et al. |
| 4,656,525 A | 4/1987 | Norris |
| 4,682,248 A | 7/1987 | Schwartz |
| 4,689,696 A | 8/1987 | Plummer |
| 4,691,253 A | 9/1987 | Silver |
| 4,701,805 A | 10/1987 | Maeshima |
| 4,706,126 A | 11/1987 | Kondo |
| 4,714,962 A | 12/1987 | Levine |
| 4,730,222 A | 3/1988 | Schauffele |
| 4,739,400 A | 4/1988 | Veitch |
| 4,758,883 A | 7/1988 | Kawahara et al. |
| 4,760,606 A | 7/1988 | Lesnick et al. |
| 4,763,204 A | 8/1988 | Kinoshita et al. |
| 4,768,110 A | 8/1988 | Dunlap et al. |
| 4,772,956 A | 9/1988 | Roche et al. |
| 4,774,600 A | 9/1988 | Baumeister |
| 4,782,399 A | 11/1988 | Sato |
| 4,803,554 A | 2/1989 | Pape |
| 4,817,050 A | 3/1989 | Komatsu et al. |
| 4,821,121 A | 4/1989 | Beaulier |
| 4,827,347 A | 5/1989 | Bell |
| 4,829,383 A | 5/1989 | Harase et al. |
| 4,837,628 A | 6/1989 | Sasaki |
| 4,847,677 A | 7/1989 | Music et al. |
| 4,855,779 A | 8/1989 | Ishikawa et al. |
| 4,858,032 A | 8/1989 | Okada et al. |
| 4,872,054 A | 10/1989 | Gray et al. |
| 4,876,590 A | 10/1989 | Parulski |
| 4,887,161 A | 12/1989 | Watanabe et al. |
| 4,897,732 A | 1/1990 | Kinoshita et al. |
| 4,903,132 A | 2/1990 | Yamawaki |
| 4,905,092 A | 2/1990 | Koshiishi et al. |
| 4,907,231 A | 3/1990 | Watanabe et al. |
| 4,914,746 A | 4/1990 | Nishi et al. |
| 4,935,821 A | 6/1990 | Sano et al. |
| 4,943,850 A | 7/1990 | Asaida |
| 4,947,271 A | 8/1990 | Nakayama et al. |
| 4,963,986 A | 10/1990 | Fukyuama et al. |
| 4,967,297 A | 10/1990 | Okita et al. |
| 4,972,266 A | 11/1990 | Tani |
| 4,974,197 A | 11/1990 | Blount et al. |
| 4,982,291 A | 1/1991 | Kurahashi et al. |
| 4,992,886 A | 2/1991 | Klappert |
| 4,994,912 A | 2/1991 | Lumelsky et al. |
| 4,999,715 A | 3/1991 | Porcellio et al. |
| 5,006,937 A | 4/1991 | Nonoshita et al. |
| 5,016,107 A * | 5/1991 | Sasson et al. |
| 5,018,017 A * | 5/1991 | Sasaki et al. |
| 5,018,083 A | 5/1991 | Watanabe et al. |
| 5,027,214 A | 6/1991 | Fujimori |
| 5,027,221 A | 6/1991 | Hisatake et al. |
| 5,029,115 A | 7/1991 | Geraci |
| 5,032,918 A | 7/1991 | Ota et al. |
| 5,032,927 A | 7/1991 | Watanabe et al. |
| 5,032,930 A | 7/1991 | Suetaka et al. |
| 5,034,804 A * | 7/1991 | Susaki et al. |
| 5,035,633 A | 7/1991 | Kobayashi et al. |
| 5,038,392 A | 8/1991 | Morris et al. |
| 5,040,068 A | 8/1991 | Parulski et al. |
| 5,058,185 A | 10/1991 | Morris et al. |
| 5,060,069 A | 10/1991 | Aoki |
| 5,065,246 A | 11/1991 | Takemoto et al. |
| 5,067,029 A | 11/1991 | Takahashi |
| 5,068,744 A | 11/1991 | Ito |
| 5,077,612 A | 12/1991 | Megrgardt et al. |
| 5,091,747 A | 2/1992 | Tsai |
| 5,097,344 A | 3/1992 | Aoki et al. |
| 5,099,846 A | 3/1992 | Hardy |
| 5,105,284 A | 4/1992 | Sakata et al. |
| 5,111,283 A | 5/1992 | Nagasawa et al. |
| 5,111,288 A | 5/1992 | Blackshear |
| 5,119,081 A | 6/1992 | Ikehira |
| 5,130,813 A | 7/1992 | Oie et al. |
| 5,153,730 A | 10/1992 | Nagasaki et al. |
| 5,164,831 A | 11/1992 | Kuchta et al. |
| 5,170,262 A | 12/1992 | Kinoshita et al. |
| 5,212,770 A | 5/1993 | Smith et al. |
| 5,214,781 A | 5/1993 | Miki et al. |
| 5,218,455 A | 6/1993 | Kristy |
| 5,227,863 A | 7/1993 | Bilbrey et al. |
| 5,231,501 A | 7/1993 | Sakai |
| 5,231,549 A | 7/1993 | Morehouse et al. |
| 5,241,659 A | 8/1993 | Parulski et al. |
| 5,280,397 A | 1/1994 | Rhodes |
| 5,287,266 A | 2/1994 | Malec et al. |
| 5,301,262 A | 4/1994 | Kashiwagi |
| 5,321,831 A | 6/1994 | Hirose |
| 5,379,376 A | 1/1995 | Bednowitz |
| 5,454,067 A | 9/1995 | Tsai |
| 5,454,096 A * | 9/1995 | Otsuka et al. ............ 395/401 |
| 5,475,539 A | 12/1995 | Orii |
| 5,661,823 A | 8/1997 | Yamauchi et al. |
| 5,724,101 A | 3/1998 | Haskin |
| 5,764,286 A | 6/1998 | Kawamura et al. |
| 5,822,082 A | 10/1998 | Sato et al. |
| 6,020,982 A | 2/2000 | Yamauchi et al. |
| 2001/0033734 A1 | 10/2001 | Hoda et al. |

FOREIGN PATENT DOCUMENTS

| | | |
|---|---|---|
| EP | 0156923 B1 | 12/1993 |
| EP | 0390421 B1 | 7/1994 |
| JP | 61-269565 | 11/1986 |
| JP | 62-237341 | 10/1987 |
| JP | 63-45760 | 2/1988 |
| JP | 63-284987 | 11/1988 |
| JP | A 64-060071 | 3/1989 |
| JP | 2-125572 | 5/1990 |
| JP | 2-172382 | 7/1990 |
| JP | 2-183675 | 7/1990 |
| JP | A 02-186882 | 7/1990 |
| JP | 2-202782 | 8/1990 |
| JP | A 02-211780 | 8/1990 |
| JP | 2-222385 | 9/1990 |
| JP | 2-257780 | 10/1990 |
| WO | 90/09717 | 8/1990 |

OTHER PUBLICATIONS

"Picture Recording and Electric Power Consumption", Shashim Kogyo, at 94 (Apr. 1988), Sumihisa Hashiguchi.

"Possibilities of the Digital Electronic Still Camera", Shashin Kogaku, at 110 (Feb. 1988), Sumihisa Hashiguchi.

"MacDOSsier, Tearing Down The Walls Between Macs and PCs", MacWorld, at 165 (Jul. 1990), Jim Heid.

"Swallowing Planets; Today's Feeding Frenzy of Data Capture", Journal of Electronic Defense, vol. 12, No. 10, at 109 (Oct. 1989), Sheldon B. Herskovitz.

"Desktop Video On The Amiga", Electronic Learning, vol. 8, No. 2, at 54 (Oct. 1988), Lanny Hertzberg.

"Imaging A Vampire; Sofware Review' Evaluation Of Three MSDOS–Based Image Processing Software Packages, ESD; The Electronic System Design Magazine, vol. 19, No. 10, at 63 (Oct. 1989), Steven J. Hollinger.

"Marketing through Innovation, Photonics at Work", Photonics Spectra, vol. 23, No. 7, at 66 (Jul. 1989), Herbert Kaplan.

Photoshop and Color Sudio: Mac Image Manipulation Tools, InfoWorld, at 118 (Jan. 29, 1990), Michael Miller.

"Digital Still Video Camera Using Semiconductor Memory Card", IEEE 1989, at 184 (1989), Izawa, et al.

"Logitech Debuts Digital Camera", Government Computer News, vol. 10, No. 19 (Sep. 16, 1991), Cynthia Morgan.

"TIFF File Format", The C Gazette, vol. 5, No. 2, at 27 (Winter 1990–1991), James Murray.

"Solid–State Electronic Still Camera Memory Card System", ITEJ 1989, at 193–194, Nakagawa, et al. (no translation).

"Digital Still Camera System", ITEJ Technical Report, vol. 14, No. 5, at 13 (Jan. 1990), Nishi, et al. (no translation).

"Card Camera 'FUJIX DS–IP'", ITEJ Technical Report, vol. 13, No. 22,.at 11 (Mar. 1989), Ochi, et al. (no translation).

"State Of The Art For The 90's Office", Appliance Manufacturer, vol. 37, No. 1, at 76 (Jan. 1989), Norman Remich.

"Highlights From Digital 90 Trade Show", Editor & Publisher, vol. 123, No. 7, at 42P (Feb. 24, 1990), Jim Rosenberg.

"Dycam Model I the 'first portable digital still camera'", MacWEEK, vol. 4, No. 35, at 34 (Oct. 16, 1990), Carolyn Said.

"Camera Uses E2 PROM Film", Electronic Engineering Times, at 45 (Apr. 10, 1989), Miyoko Sakurai.

"Picture Coding For Digital Still Camera", Toshiba Review, vol. 45, No. 8, at 635 and 638 (1990), Sasaki (no translation).

"Dycam premiers still–video camera", MacWEEK, Vol. 4, No. 11, at 27 (Mar. 20, 1990), Carolyn Said.

"Camera Uses E2 PROM Film", Electronic Engineering Times, at 45 (Apr. 10, 1989), Miyoko Sakurai.

"Picture Coding For Digital Still Camera", Toshiba Review, vol. 45, No. 8, at 635 and 638 (1990), Sasaki (no translation).

Digital Electronic Still Camera System, ITEJ Technical Report, vol. 13, No. 22, at 17 (Mar. 1989), Sasaki, et al. (no translation).

"Now And Future Of Electronic Still Camera", 1990 Joint Convention Record of Institutes of Electrical and Information Engineers, Japan (Aug. 28–30, 1990) Sasaki et al. (no translation).

"Graphics Power For The Rest Of Us", PC World, at 164 (Nov. 1990), Mike Smith–Heimer, et al.

"Digital Still Camera For Business Use", Electronics Life, at 84 (Apr. 1990), Someya (no translation).

"Photoshop is Picture–Perfect", Byte, at 103 (Apr. 1990), Tom Thompson.

"Freelance Masters OS/2", PC World, at 85 (Nov. 1990), John Walkenbach.

"Overview Of The Jpeg (ISO/CCITT) Still Image Compression Standard", SPIE, vol. 1244 Image Processing Algorithms and Techniques, at 220 (1990), Gregory Wallace.

"A Bit Rate Controlled Dci Compression Algorithm For Digital Still Camera", Proc. of SPIE –The International Society for Optical Engineering, vol. 1244 at 234 (Feb. 12–14, 1990), Watanabe, et al.

"Photos Go Electronic: New Standard Pulls Images Into Computer Age", High Technology Business, vol. 8, No. 2; at 15 (Feb. 1988), Robert Wood.

"AGA Thermovision Digital Image Processing System", by AGA Infrared Systems AB (1982).

"AGA Thermovision OSCAR –Pericolor System –Product Information", by AGA Infrared Systems AB (Copyright 1980).

"Agema Product Specification –TIC–8000 with CATS, A Complete Hardware/Software Package For Thermal Analysis", by Agema Infrared Systems (1986).

Apple SuperDrive: User Guide, http://docs.info.apple.com/article.html?artnum–4545 http://docs.info.apple.com/article.html?artnum–4546 http://docs.info.apple.com/article.html?artnum–4547 (Aug. 2, 1989), Apple Computer, Inc.

Canon XapShot RC250 Manual (1988).

Canvas 2.0 software.

Canvas 2.0 Upgrade Manual, at v. (1988), Levy et al, Deneba Systems, Inc.

CompuServe Financial Services User's Guide, at 4–10 (Jul. 1988), CompuServe Incorporated.

CompuServe Information Manager User Guide, at 115, 121, 172, 182, 183 (Nov. 1989), CompuServe Incorporated.

CompuServe Information Service, VIDTEX 4.0 Standards for Terminal Emulator Programs (Apr. 1985), CompuServe Incorporated.

"Curtis Inc. Announces New Prices And New ROMDISK Models", New Release (Jan. 4, 1988), Curtis, Inc.

Dataviz "MacLink Plus" Advertisement, MacWorld, vol. 7, No. 4 (Apr. 1990).

"Digital Back For Medium–Format Rollei Cameras", Editor & Publisher, vol. 124, No. 8, at 23P (Feb. 23, 1991).

"Digital Camera –The Path To The Present", by Japan Camera Museum (Oct. 24, 2000) (no translation).

DRAW, a Hi–Res Drawing Program by Micro–Labs, Inc. (1984).

"Fujifilm Brings The Digital Camera Ds–7 With Convenient SmartMedia Storage To The Consumer Market", http://www.fujifilm.co.jp/eng/salon/pkna/digi–l.html (Sep. 18, 1996).

Fujix Digital Still Video Camera DS–IP, Fuji Photo Film Co., Ltd (1988).

FUJIX DS–X user's manual (1991).

Graphics Interchange Format (GIF) Specification, pp. 1–18, CompuServe (Jun. 15, 1987).

Graphics Interchange Format, Version 89a, pp. 1–42, CompuServe (Jul. 31, 1990).

Heat Made Visible –The World of Infrared, by Agema Infrared Systems (1989).

HMI Protocol Definition Document, Remote Terminal Interrogation Sequence 1.10.2, at 1.

IBM Disk Operating System Version 3.3 User's Guide and Reference, First Edition (Apr. 1987).

"IC Card Camera System –Toshiba & Fuji Photo Film", Dempa Daily Newspaper Technical Report (Mar. 30, 1989).

Inside Macintosh Volume V by Apple Computer, at V–85 to V–115 (Jan. 1988).

Macintosh MacPaint Manual, Apple Computer, Inc. (1983).

Macintosh Manual (1984).

"Maintenance Technology –Infrared Thermography"Agema Infrared Systems (Nov. 1989).

Microsoft MS–DOS User's Guide Version 3.3, Microsoft Corporation (1987).

MS–DOS 4.0.

"Palmtop Computer Sales Soar", The Atari Report, vol. 3, No. 1, at 5 (of printout), Atari Corporation (Spring 1990).

PhotoMac, User Manual, at 105–106, Avalon Development Group, (1988), Ewart et al.

Prototype Announcement, Fujix DS–IP digital still camera, Fuji Photo Film Co., Ltd., Fuji News (Sep. 20, 1988).

"Reviews: Adome Photoshop 1.0", MacWorld, vol. 7, No. 6, at 186 (Jun. 1990).

SLIDESHOW, a RAPIDOS Software by Rapidynamic Software, Inc., licensed to Micro–Labs (1984).

"Still Videos, Anyone?", IEEE Spectrum, at 41 (Feb. 1990).

"The Atari Portfolio Palmtop", http://www.atari–history.com/computers/pccomputers/portfolio.html (1989).

Thermovision 400 Series Operating Manual, by Agema Infrared Systems (1991).

"Thermovision 470 Information –Thermovision 470 System", by Agema Infrared Systems (1989).

Thermovision 800 Series Burst Recording Unit –Burst Recording Unit, by Agema Infrared Systems (1989).

TIC–8000 With CATS E –Thermovision 800 Series TIC–8000 With CATS E The Complete Hardware/Software Package For Thermal Analysis, by Agema Infrared Systems (1988).

BountyQuest Digital camera with PC–compatible output format Bounty, http://www.bountyquest.com/bounties/displayBounty.php?bounty Name=1121, Bounty Quest Corp., Inc. (2002–02).

Thermovision 470 Technical Specification, Thermovision 400 Series Operating Manual, AGEMA Infrared Systems AB (1989).

Macintosh IIx Owner's Guide (1988).

Macintosh SE with FDHD (SuperDrive).

NASA Tech Briefs, Digital Electronic Still Camera, at 30 (Jun. 1993), Samuel D. Holland, et al.

"Still Video –Still Here?", Electronics World & Wireless World, at 873 (Oct. 1990), George Cole.

Macintosh System Software User's Guide Version 6.0 (1988).

Personal Vision Live Video/Frame Grabber for Macintosh II (1989).

"StuffIt", Macuser, at 77 (Dec. 1988).

Apple II System Utilities Manual, Apple Computer, Inc. (1985).

Apple IIGS System Software User's Guide, Version 5.0, Chapter 2 and Chapter 6.

* cited by examiner

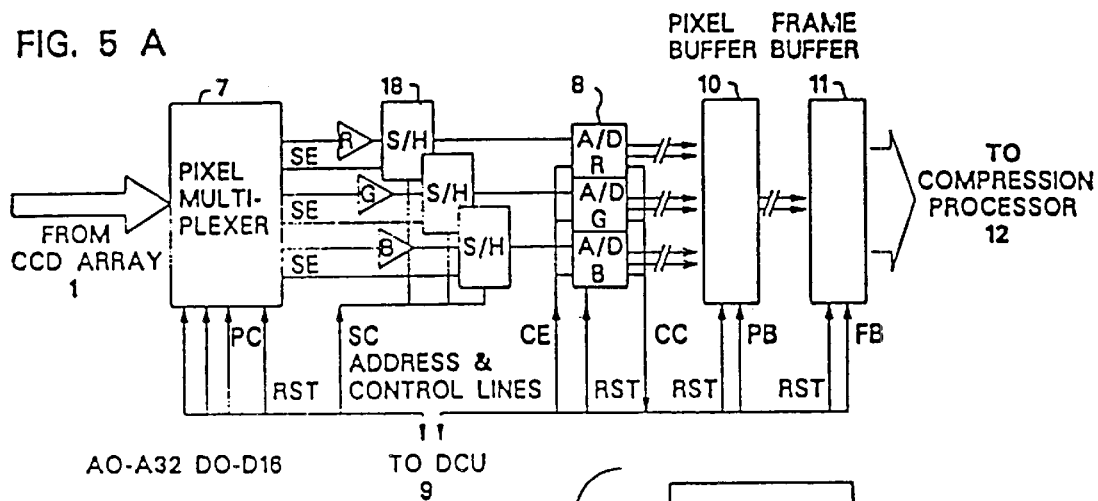
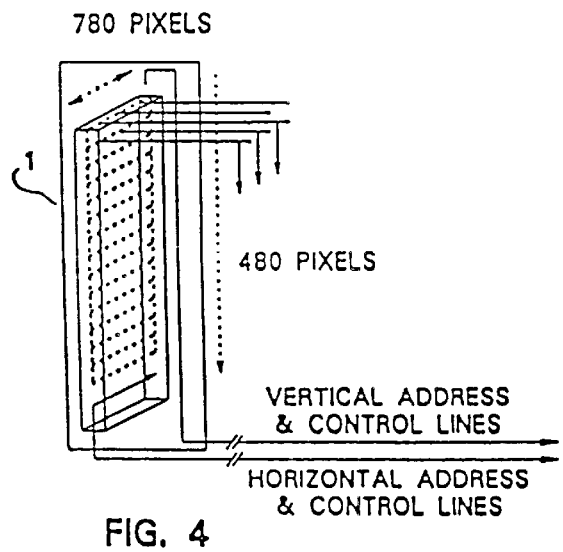
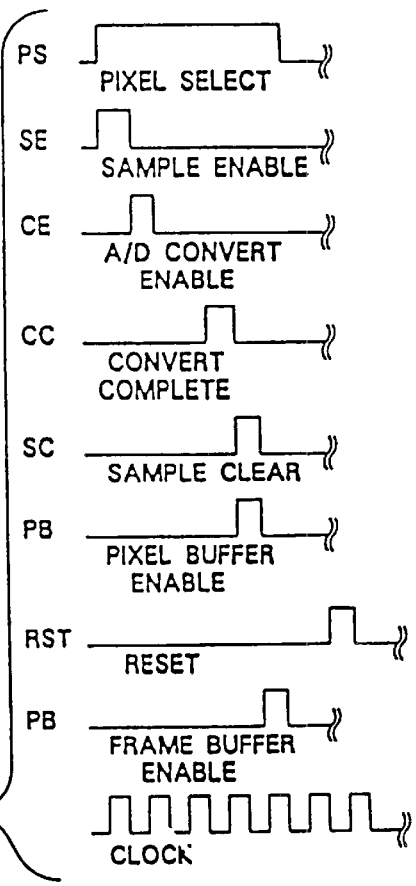

DIGITAL CAMERA WITH MEMORY FORMAT INITIALIZATION

This is a continuation of U.S. patent application Ser. No. 09/253,831, filed Feb. 19, 1999, now U.S. Pat. No. 6,233,010 which is a continuation of Ser. No. 08/712,493, filed Sep. 11, 1996, pending which is a continuation of Ser. No. 08/098,787, filed Jul. 29, 1993, now U.S. Pat. No. 5,576,757, which is a continuation of Ser. No. 07/878,603, filed May 5, 1992, now abandoned, which is a continuation of Ser. No. 07/615,848, filed Nov. 20, 1990, now U.S. Pat. No. 5,138,459.

BACKGROUND OF THE INVENTION

1. Field of the Invention

This invention generally relates to an electronic still video camera and in particular to an improved electronic still camera which converts a still picture of an object or scene into an operator selectable compressed digital signal format for storage utilizing a compression/decompression algorithm, such as the Joint Photographic Experts Group (JPEG) algorithm standard for example, formatted into Personal Computer (PC) compatible format retaining the images' color information, and stored on a PC compatible memory diskette. For example, the diskette can be a three and a half (3½) inch digital diskette. The digital diskette is removeable from the electronic camera for direct insertion into a PC which contains the previously loaded corresponding decompression algorithm whereby the digital image is in a format compatible for immediate use with word processing, desk top publishing, data base, and multi-media applications.

2. Description of the Prior Art

FIG. 1 is a schematic block diagram showing structure of a conventional prior art electronic still camera system, in which a CCD image sensor element 1a converts a still image of an object into an analog color video signal when the shutter control circuitry 2a is activated. The output color video signal of the image sensor element is then routed to the signal processing subsystem 3a where the signal is converted to National Television System Committee (NTSC) or other composite video formats (such as the European video standard Phase Alternating Line-PAL) and logged in analog format onto a mass memory storage device such-as an analog video floppy disk, Electrically Erasable Programmable Read Only Memory (EEPROM), analog audio cassette, bubble memory, or other storage device 5a. Power is supplied by a rechargeable/removeable battery system 4a.

An electronic camera that converts an image into electronic image signals and transferred to a memory storage device is disclosed in the following U.S. Pat. Nos. 4,131,919; 4,456,931; 4,758,883; 4,803,554; and 4,837,628.

Conventional prior art electronic still cameras, for example of the types disclosed in the aforementioned references, produce an electronic signal corresponding to a desired image in analog format such as the National Television System Committee (NTSC) or similar on magnetic or electronic storage media for either permanent or temporary storage to facilitate viewing on a television or video monitor. With the current state of the art, it is expensive and time consuming to convert the analog image equivalent to a digital format for direct utilization with PC software applications. Currently, to convert an image captured on an electronic still camera to a PC compatible format one must convert the signal back to either a composite-NTSC or ROB video signal and use a conversion device such as a "frame grabber" (a digital circuit board installed into PCs that convert video images into PC compatible formats) of the type sold commercially by Aapps Corporation, Orange Micro, RasterOps, and others or convert the image to a hard-copy print (a photograph) and utilize an electronic "scanner", a piece of equipment that connects to a PC, which converts an image into a digital format. The later technique is employed extensively within the desktop publishing industry.

SUMMARY OF THE INVENTION

It is the object of this invention to provide an improved electronic still camera with operator selectable picture compression in one of a plurality of operator selectable digital data formats recordable on a standard removeable magnetic diskette common to personal computers.

It is a further object of this invention to provide an improved electronic still camera that provides digital image files for immediate and direct incorporation into popular word processing, desktop publishing, and other software programs on PCs.

It is another object of this invention is to provide an improved electronic still camera that, under user selection, can record and store still images selectively compressed in a directly insertable digital memory storage device into a PC in either color or black and white formats thus facilitating storage of a large number of images with the signal flag indicating the degree of compression selected by the operator as well as the color/black and white mode selection being stored as digital values on the digital memory storage device with each image frame.

An additional object of this invention to provide an electronic still camera device that can rapidly capture a series of images automatically as well as singularly. Also, this camera provides multiple outputs in both video format for monitor and display of images and digital formats to facilitate data transmission, additional processing, or storage to a variety of storage media.

It is still another object of this invention is to provide a more efficient electronic still camera that can take a still picture with operator selectable high, medium, or low resolution in either color or black and white by electronic shutter and exposure control by utilizing a variety of electro-optical sensors including Charge Coupled Devices (CCD), Infrared (IR), and Ultra Violet (UV) which can be directly or remotely controlled by analog, digital, or radio frequency (RF) control signals.

A further object of this invention is to provide a programmable video picture translator device for efficiently converting electronic still images in analog composite video format into digital data format readable by a PC. This translator device also provides additional video inputs and outputs for capturing video images, monitoring video images on monitors and displays, and can transmit either compressed or unprocessed digital image data through a variety of output I/O channels in various formats such as serial, parallel, etc. Also, this invention can incorporate sound/voice with images thru additional interface circuitry and audio digitizers.

Finally, it is the object of this invention to provide an electronic still camera that is efficient in design and permits extended periods of portable operation and which provides the user with operational status through the use of continuous internal self-test software routines and operator displays.

BRIEF DESCRIPTION OF THE DRAWINGS

FIG. 4 is an example of a ½" CCD array utilizable in accordance with one aspect of the present invention.

FIG. 5A is a schematic block diagram showing the image signal to digital signal conversion logic in accordance with one aspect of the present invention.

FIG. 5B is a logic and timing diagram for the image signal to digital signal conversion logic in accordance with one aspect of the present invention.

DESCRIPTION OF THE PREFERRED EMBODIMENT

Figure 1:
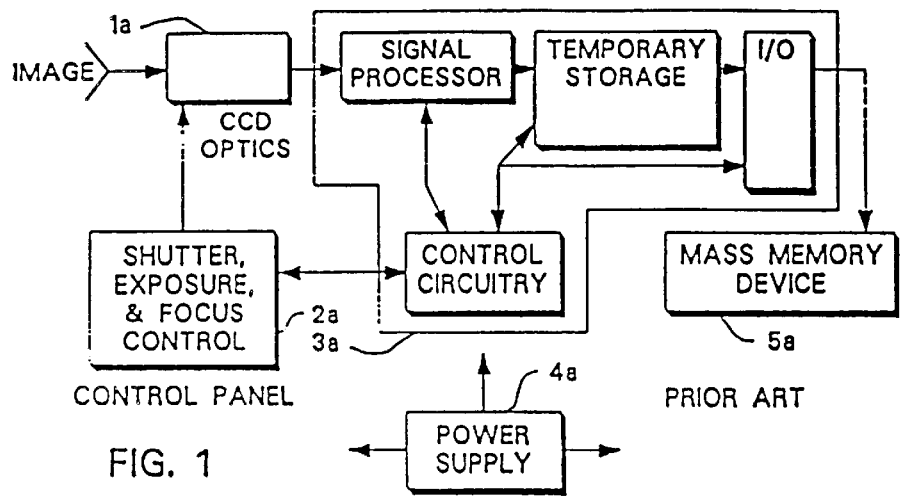
FIG. 1 is a schematic block diagram of a conventional prior art electronic still camera.
Figure 2:
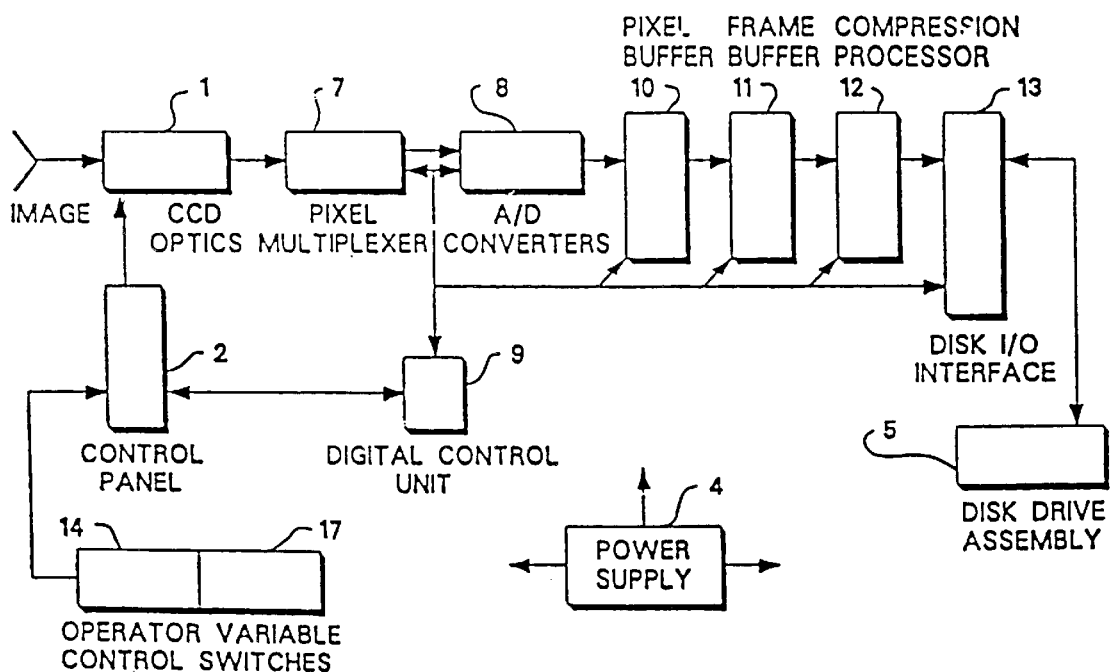
FIG. 2 is a schematic block diagram of the of the overall structure of an electronic still camera embodying the present invention.

FIG. 2 is a schematic block diagram of the preferred embodiment of an electronic still camera in accordance with the principals of the invention. Referring to FIG. 2, an image optical pick-up element 1, which for example could be a Charge Coupled Device (CCD) (or an Infrared (IR) or Ultraviolet (UV) sensor), converts a still image of an object into an electric signal when a picture "shoot" command is initiated by the operator via control panel 2. When taking a picture, focusing and shutter speed are controlled by a lens system and shutter speed selection mechanism under control of the digital control unit 9. The camera, like other still video cameras, employs an electronic shutter system that controls a charge storage time in a CCD array onto which an image of an object is focused through the lens system.

When the "shoot" control 6 is half depressed (see FIG. 6), a power supply voltage is supplied from the rechargeable batteries 4 to the electronic circuits and digital control unit 9, control panel 2, and the disk drive assembly 5. The exposure control circuitry not shown generates appropriate horizontal and vertical transfer pulses as well as field shift pulses under control of the reference clock timing and control signals provided by the digital control unit 9 type for driving the CCD device and pre-processing circuitry. This design may be of any type well known in the art for example those cited in U.S. Pat Nos. 4,131,919 and 4,456,931 and any similar designs well known in the prior art.

Figure 6:
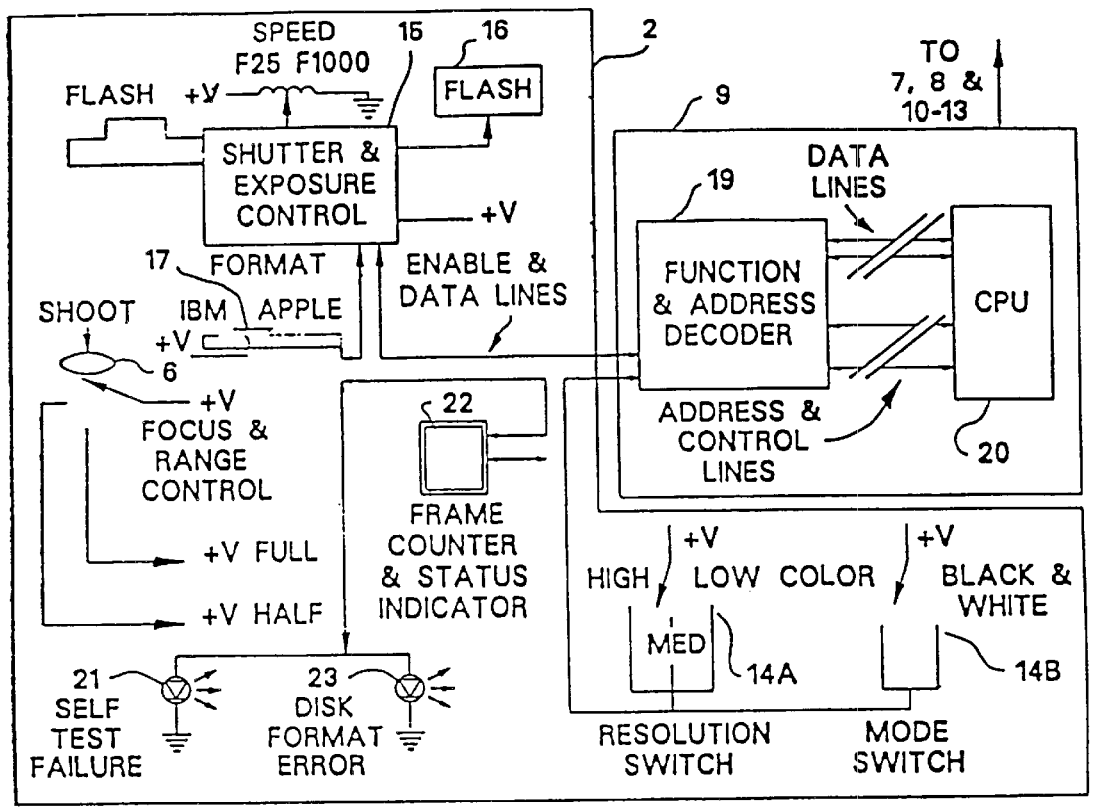
FIG. 6 is an example of the control panel logic in accordance with one aspect of the present invention.
Figure 6A:
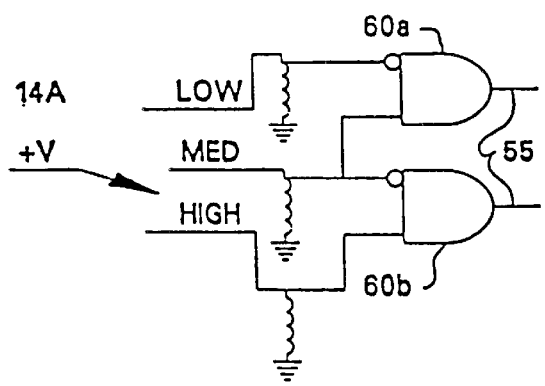
FIG. 6A is an example of one embodiment of switch logic of the control panel switches and controls utilizable in accordance with one aspect of the present invention.
Figure 6B:
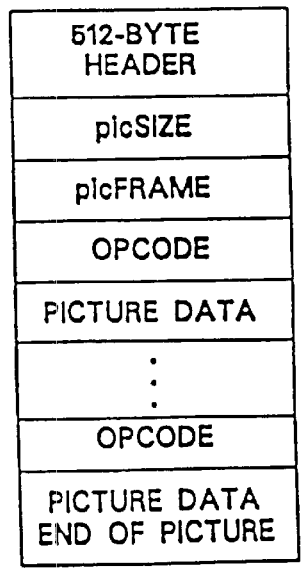
FIG. 6B is an example of the PICT image file format based upon the published standard provided by Apple Computer, Inc.
Figure 6C:
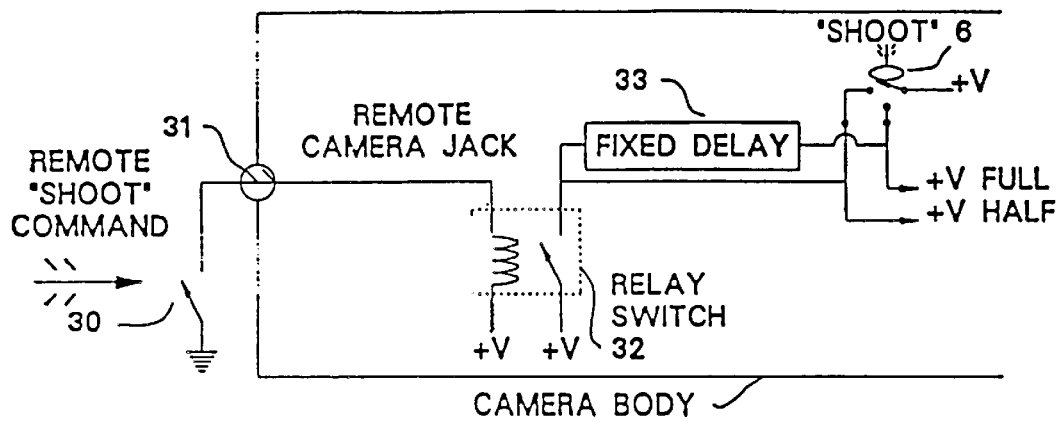
FIG. 6C is an alternate embodiment of the current invention embodying remote operation.

An-alternate embodiment of the present invention that provides remote operation of the camera is shown in FIG. 6C. When remote "Shoot" control 30 is activated by any means for example manually, or by radiant, or electronic energy, a control signal is generated and routed through the external jack 31, located on the external camera body. The external control 30 is electrically connected to the external jack 31 by a twisted-pair conductive cable assembly that is familiar to those skilled in the art Upon receipt of the externally generated "shoot" command, the relay switch 32 is activated and provides internal switch closure. This closure of switch 32 then initiates the process previously described and provides the half V+ voltage previously described. The full V+ is provided via the fixed delay 33, the value chosen to allow the diskette drive assembly 5 (FIG. 2) and associated control circuitry to initialize prior to receiving image data.

When the "shoot" control is fully depressed in either embodiment, the shutter controller 15 (FIG. 6) generates a shutter pulse that generates control signals for the A/D converters 8 allowing the image/picture data signal in the sample and hold circuitry of the pixel multiplexer 7 to be converted into a digital signal. Control and address instructions of the type well known in the art are generated from the digital control unit 9 to facilitate the storage of the digital image data within the pixel buffer 10 and frame buffer 11. Upon completion of image conversion, the contents of the frame buffer are transferred to the compression processor 12 which for example may be of the many versions currently offered commercially such as C-Cube's (San Jose, Calif.) four chip Application Specific Integrated Circuit (ASIC) set. In the compression processor 12, the Joint Photographic Experts Group (JPEG), a part of the International Standards Organization (ISO) which is a subset of the International Telegraph and Telephone Committee (CCITT), image compression algorithm fully described in Report #JTC1/SC2/WG8 dated 1985 is performed under control of the digital control unit 9 to compress the size of the image. A variable selectable compression ratio of up to 50:1 is performed on the digital image frame. Other compression ratios are operator selectable via the control panel 2 switches 14A and 14B (FIG. 6). The compressed digital frame is then formatted into either an IBM PC/Clone (such as GIFF) or Apple Macintosh (such as PICT II) image file format depending on the setting selected by the operator for a user switch 17 (FIG. 6) position on the control panel 2. After formatting, the file is written into a temporary memory buffer within the disk input output (I/O) interface circuit 13 which, under the command of the digital control unit 9, controls the high density (1.4 Mbyte storage capacity) disk drive unit 5. Following file transfer to the diskette e.g., the frame counter display 22 on the control panel 2 is updated by appropriate control signals and the camera is ready to undergo the same procedure for the next image. Power to the electronic circuits and disk drive system is terminated following release of the "shoot" control switch 6.

Figure 2A:
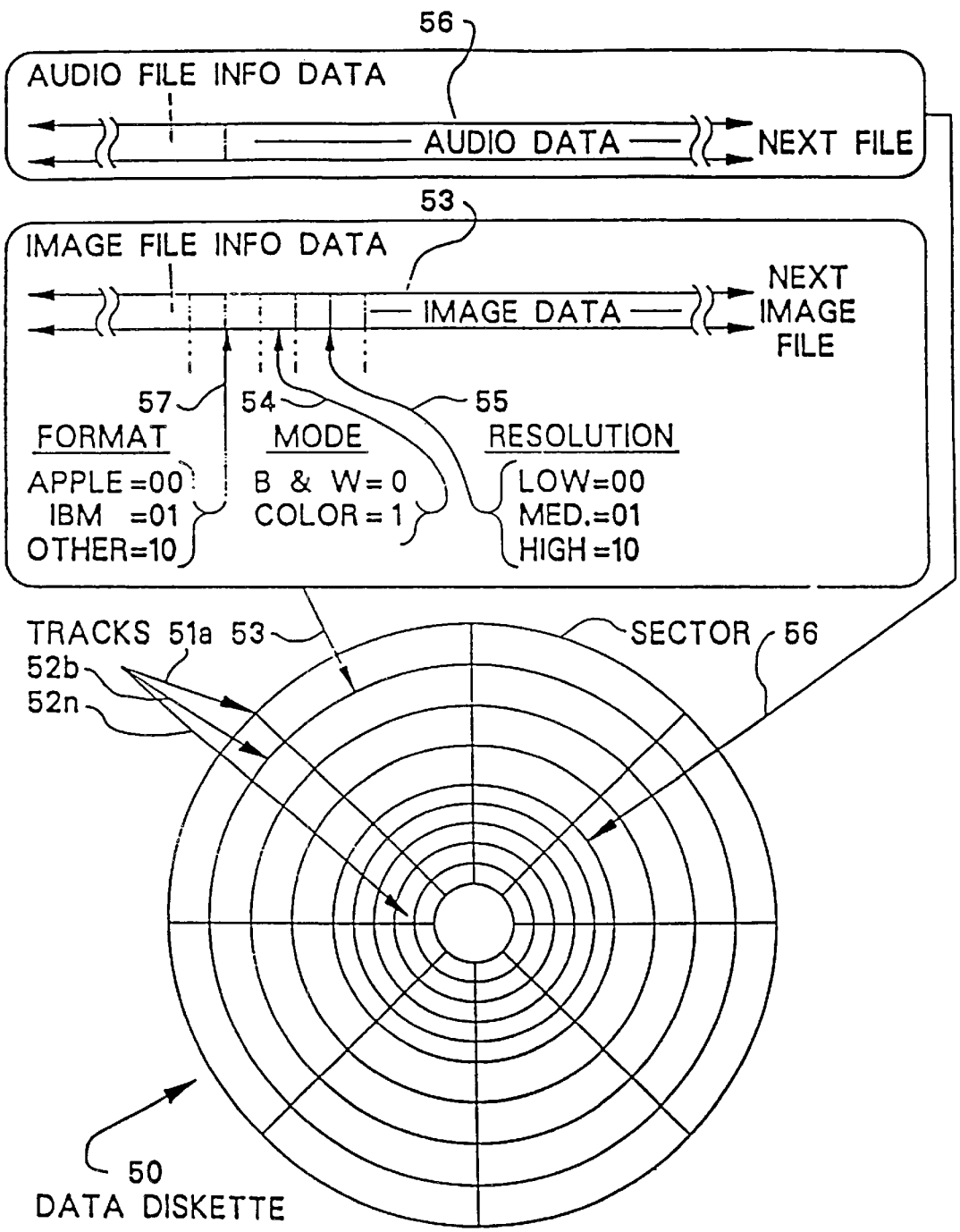
FIG. 2A is an illustration showing one embodiment of an audio data file, data format flag, compression level, and color/black and white mode selection values stored on a digital memory diskette storage device.

In accordance with the preferred embodiment of this invention, it is permissible for the user to select various resolution quality image recording levels with the higher levels being at the expense of memory diskette storage capacity. The position of switches 14A and 14B for example could represent a unique digital mark or word that denotes the respective switch position and is sensed during initial power application and periodically during operation. FIG. 6A illustrates typical logic AND gate circuits 60a and 60b utilizable in conjunction with switches 14A and 14B or switch 17 to generate appropriate signals to designate respective switch positions and generate appropriate control signals from. The switch positioned in the High position for high resolution allows only four to five images to be stored, while Med, switch position for medium resolution allows approximately twenty five images to be stored, and Low for low resolution allows up to fifty images to be stored on a single diskette. Also, by selecting black and white mode instead of color via switch 14B, the operator may select additional storage capacity since storage is increased by a factor greater than three (one element per pixel versus three for color). Various image resolution combinations are permissible because the operator can select a different resolution and mode setting for each image prior to image signal capture. This is accomplished by marking or "tagging" each image frame data information signal with the resolution and mode of each image as it is written onto the memory diskette in any suitable manner, for example as shown in FIG. 2A. With reference to FIG. 2A, diskette 50 has tracks 51a, 52b, . . . 52n. With reference to track 52b there is shown a representative portion of segment 53 depicting a typical image file information format having digital bit 54 depicting color mode, and digital bits 55 representing compression resolution level markings or tags. With reference to color mode tag 54 it can be seen that if switch 14B is in the color position tag 54 is recorded as a logical "one" or true-conversely if bit 54 is recorded as a logical "zero" it corresponds to the black and white position of switch 14B. Similarly as shown switch 14A would record in memory position 55 a binary "zero" for low resolution, a binary "one" for medium resolution and a binary "two" for high resolution selections by the operator. By incorporating this "tagging" approach, it is possible for the decompression algorithm, loaded into any PC prior to use or written onto the memory storage diskette along with the image data, to automatically determine the appropriate level of compression associated with image file and execute decompression efficiently.

Still another alternate embodiment in accordance with this invention incorporates an acoustic digitizer circuit which digitizes sound. There are several digitizers commercially available such as the Apple Computer Inc. Musical Instrument Data Interface (MDI) adaptor. The output of this digitizer may be selectively connected to the CPU 20 (FIG. 7) via an additional I/O interface similar to the auxiliary I/O interface 80. The sound or audio associated with each image can be recorded, digitized, and stored on the diskette device on available tracks in an identical manner previously described (FIG. 2A). An image file in accordance with this embodiment would be appropriately marked or tagged with the corresponding digitized audio file 56 (FIG. 2A). Upon playback on a sound configured PC, both the image and the corresponding audio would then be viewed and heard simultaneously.

It should be noted that a major advantage a camera in accordance with the present invention has over conventional still video cameras is that a camera according to this invention is capable of storing multiple digital images in semiconductor memory temporarily at a rapid rate while, simultaneously, the image compression processor 12, file formatter software algorithm, and disk I/O interface 13 that stores formatted files continue to function in concert together at a slower rate. This efficient design coupled with VLSI low power, high speed semiconductor memory devices (10 & 11 FIG. 5A and 24 FIG. 7) allows this operational capability.

Like most other still video and conventional film cameras, when the "shoot" control 6 (FIG. 6) is fully depressed, a control signal is generated from the digital control unit 9 that generates a trigger signal on the control panel 2 to cause a flash unit 16 (FIG. 6) to irradiate a flash of light onto the subject image.

Figure 3:
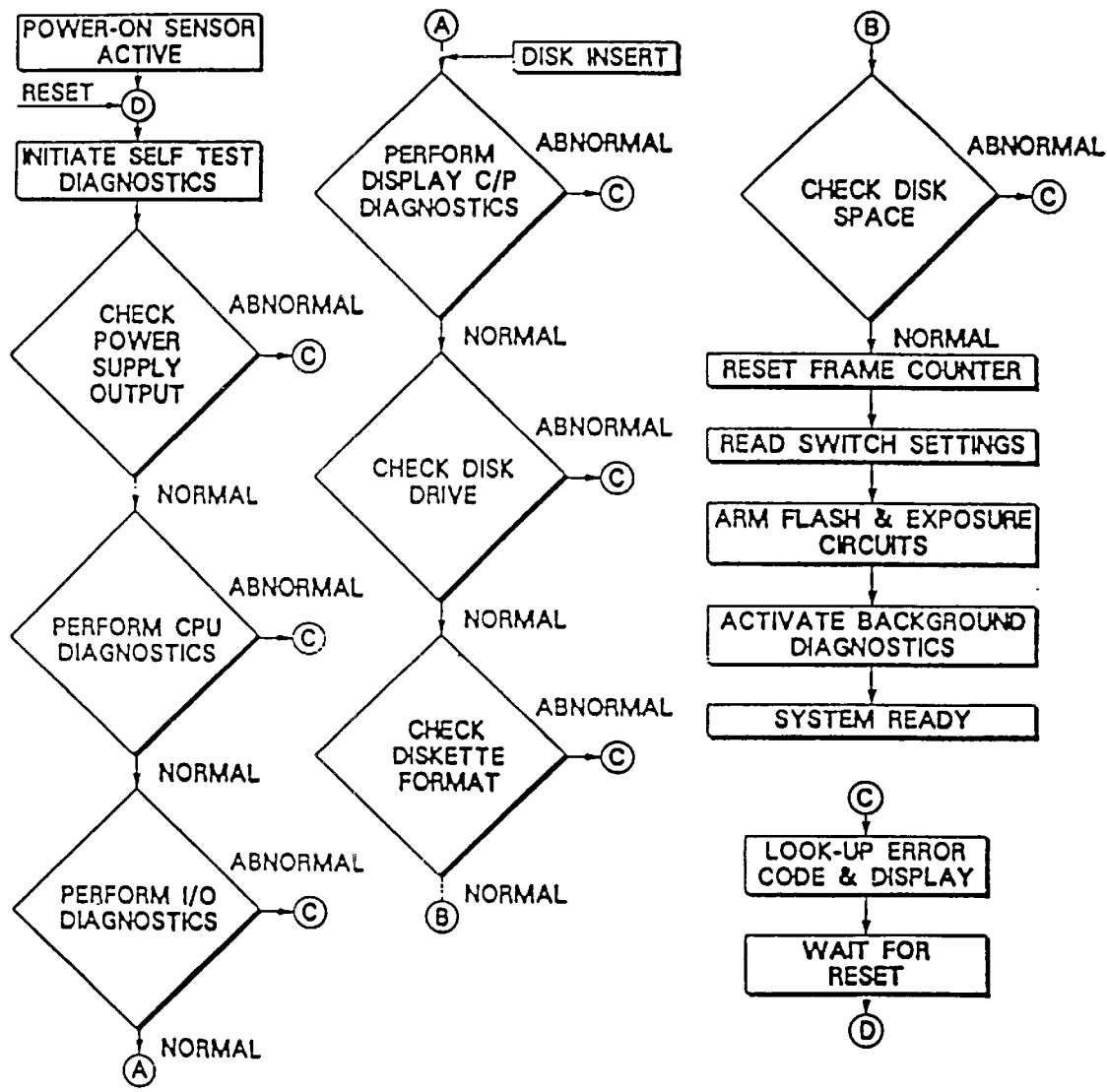
FIG. 3 is a flowchart showing the power-up and continuous self-test sequence in accordance with one aspect of the present invention.

During initial camera operation, the user first inserts a diskette such as a standard three and a half inch or similar storage medium. Various memory diskette sizes and formats are suitable for the invention. However, for the preferred embodiment either a double-density (800 Kbytes of storage) or a high-density (1.4 Mbytes of storage) diskette in a three and a half inch format which are readily available from various commercial sources such as Sony, Maxell, and Verbatim. The user must then select the desired PC format (IBM PC/Clone or Apple Macintosh, etc.) via switch 17 (FIG. 6) on the control panel 2. As shown in FIG. 3.; after turning on the power switch or inserting a diskette 50, the digital control unit 9 performs a self test of all internal circuitry, battery, disk drive unit, and control panel. Should any failures be detected, an appropriate error indicator is illuminated on the control panel. During the power-one sequence (see FIG. 3 and FIG. 12), the inserted diskette 50 is automatically checked for formatting consistencies in accordance with the format selected by the format switch 17 on the control panel 2 (IBM/Apple/etc.) and for available storage space by checking the boot block on the diskette, a technique that will be familiar to those skilled in the art. Should any inconsistencies be detected, an error indicator is illuminated on the control panel (ie, disk full, unformatted, etc.). The operator frame counter display 22 (FIG. 6) is then updated to show the maximum number of pictures available based upon indicated operator selections (color/black and white), diskette type (double versus high density), and capacity (partially full versus empty diskette). During operation, the operator can selectively erase a frame and record over it if desired by selecting the erase mode of operation from the control panel and toggling the forward/reverse control.

The optics for the preferred embodiment of the invention is a commercially available one-half inch (½") color CCD device having a pixel grid array of 780×488 as pictorially depicted in FIG. 4. This results in 380,640 pixel elements which results in a commercially acceptable quality resolution image as will be understood by those skilled in the art. In a color imaging device (CCD array) photoelectric elements, such as photodiodes, are arranged in a two dimensional array with optical filters for R (red), G (green), and B (blue). Various arrangements of optical filters are well known and the arrangement of optical filters is not limited to a particular one with this invention. During operation each pixel stores a charge corresponding to the amount of incident light. The RGB components of each pixel's charge is sequentially read out via a horizontal/vertical addressing scheme that will be familiar to those skilled in the art.

As shown in FIG. 5A; each charge, when addressed, is amplified and processed in a sample and hold (S/H) circuit 18. The analog voltage in each S/H circuit is digitized by an associated analog to digital (A/D) converter 8. The digital values are routed and collected in the pixel buffer 10. Following completion of discrete pixel element conversion and subsequent formatting in the pixel buffer which is under Control Processor Unit (CPU) 20 software control, the output of the full pixel buffer is routed to the frame buffer 11 by digital control unit 9. This process continues until a complete frame is collected within the frame buffer. The general digital logic and timing and control signals for this circuitry is shown in FIG. 5B. The timing is provided by a master clock that is an integral part of the CPU microprocessor. For example, the MOTOROLA 68040 microprocessor has a clock speed of approximately 40 Megahertz (MZ which results in a clock period of 25 nanoseconds (nsec.). This clock pulse is used by the function and address decoder 19 (FIG. 6) to generate the address and control signals shown in FIG. 5B as would be understood by those skilled in the art. The circuit of the present invention may be designed by one skilled in the art to function with a variety of microprocessor architectures and is not limited to any one in particular. One can see from the timing chart that the S/H circuit is allowed (via the SE command) to charge to a voltage level indicative of the analog voltage impinging upon the pixel element (via the PS command). After a fixed time period, the A/D converters are enabled(via the CE command) to begin conversion of the analog voltage value on the S/H. Upon completion of conversion a conversion completion signal (CC) is generated by the A/D and routed back to the S/H circuit (via the SC command which is generated by the function and address controller 19) to discharge the stored analog voltage in anticipation of the next pixel element conversion process. Next, the output of the A/D converter 8 is clocked into the pixel buffer 10 (via the PB command). When the pixel buffer 10 is full, the output is clocked out to the frame buffer 11 (via the FB command) and the pixel multiplexer address circuitry selects the next pixel for conversion. Reset signals (RST) are sent to all circuit elements to allow these devices to reset prior to receiving the next analog value.

Another novel concept of the present invention as illustrated in FIGS. 5A and 5B utilizes a technique of paralleling the S/H and A/D devices for each pixel element thus accelerating the image signal analog-to-digital conversion process. This is accomplished by eliminating the serial S/H and A/D path typical of prior art still video camera designs. In addition, high-speed, low-power devices available from Sony, Burr-Brown, Datel, Analog Devices, and others facilitate the increased conversion throughput of the S/H and AID circuits with pixel conversion times of less than 150 nanoseconds (nsec.). For example, Sony's video A/D converter Device part number CXA 1016P/K performs up to 50 million samples per second or 20 nsec. per conversion. This device, or similar, may be used in the preferred embodiment of the present invention. As explained previously, prior art still video camera designs multiplex each signal component into a common/singular A/D path to reduce the number of components and power consumption. However, in accordance with another aspect of the present invention components such as CMOS and ECL devices coupled with miniaturized packaging techniques such as surface mount devices (SMD) and ASIC technology make it feasible to incorporate these devices in a parallel design in order to realize a substantial increase in conversion speed with no appreciable increase in power consumption. Therefore, this design approach provides significant conversion throughput increases over previous designs.

Figure 13:
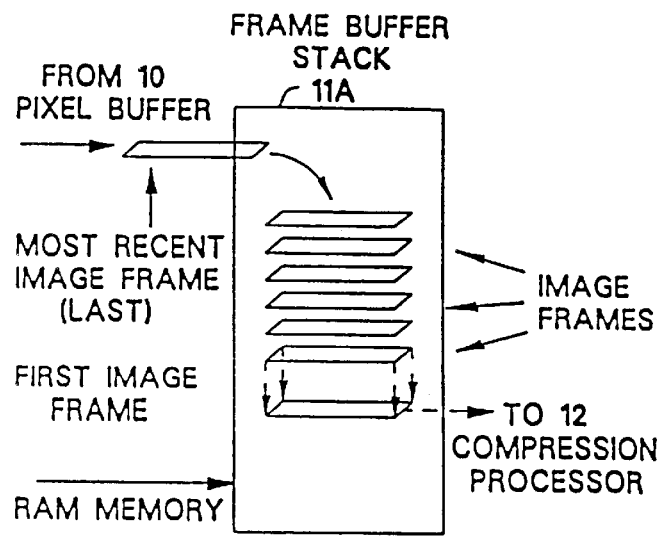
FIG. 13 is an alternate embodiment of a frame buffer utilizable in accordance with another aspect of the present invention showing a frame buffer stack permitting multiple shot mode.

The extremely high conversion speed in accordance with another concept of the present invention makes multiple high-speed camera operation possible in an alternate embodiment. For example, total conversion time required for the aforementioned CCD array utilizing the circuit of the present invention (FIG 5A) requires approximately 380, 640×150 nsec. or 38 milliseconds (msec.). Additional time (approximately 5 msec.) is required for timing and control signal latency. Thus, total conversion time for a complete image frame prior to compression processing and logging to the memory storage diskette 50 is less than fifty msec. This allows for approximately 20 images to be captured in a one second period. By adding additional RAM 11A (FIG. 13) or other forms of commercially available random access memory to the frame buffer 11, image frames could be "pushed" onto a semiconductor memory stack for temporary storage allowing the compression processor and data interface circuitry to perform their respective functions at a slower rate. As shown in FIG. 13, each unprocessed image frame would be recorded or "pulled" from the stack on a "First-In, First-Out" (FIFO) manner until all images in the stack queue were processed and written to the storage diskette via the disk I/O circuitry 13.

As shown in FIG. 6, control panel settings are monitored by the CPU 20, a microprocessor, thus allowing the appropriate timing, control, and signal processing to be effected properly. The microprocessor 20 may be of the type 68040 manufactured by MOTOROLA, Intel's 80386 series, or equivalent microprocessors which specifications are commercially available and are incorporated herein by reference. The microprocessor utilization of this invention, which is in the digital control unit 9, transmits commands and status to specific controls, functions, and displays in the control panel as well as receiving both circuit status/control data and operator commands through polling the operator switch settings 14A, 14B, and 17 via the bidirectional function and address decoder 19. This approach allows the user to know immediately how much storage capacity remains in the image storage diskette 50 as well as the camera's overall operational and functional status through the use of status displays 21, 22, and 23 and ongoing software self-tests running in the background as depicted in FIG. 3. An example of this would be a low battery situation. First, the digital control unit 9 would detect a failure in the self-test mode. Next, the self-test light emitting diode 21 (FIG. 6) would be illuminated and an appropriate error display would be illuminated in the status display 22 thus providing the user with an exact indication of the error. Another example illustrating the operation of this embedded microprocessor type of control approach is the format switch 17 (FIG. 6). The position of the format switch 17 is sensed upon power application. Following diskette insertion, the boot block on the diskette is compared with the format switch 17 setting (IBM/clone or Apple) and if the format does not match or if the disk 50 is unformatted, the disk format status light emitting diode 23 would be illuminated and an appropriate error display would be illuminated in the status display 22 thus prompting the user to take appropriate corrective measures.

An alternate embodiment of the present invention involves adding an auxiliary I/O interface circuit or port to the digital control unit 9. As shown if FIG. 7, the auxiliary I/O port 80 connects in a manner similar to the Disk I/O interface 13. This additional I/O channel provides for external control and monitor of all timing and control signals internal to the camera. In addition, it allows for the image data to be routed past or around the compression processor out to any additional internal or external device such as an optical disk storage device, digital analyzer, or other data processors that might be desired.

Figure 7:
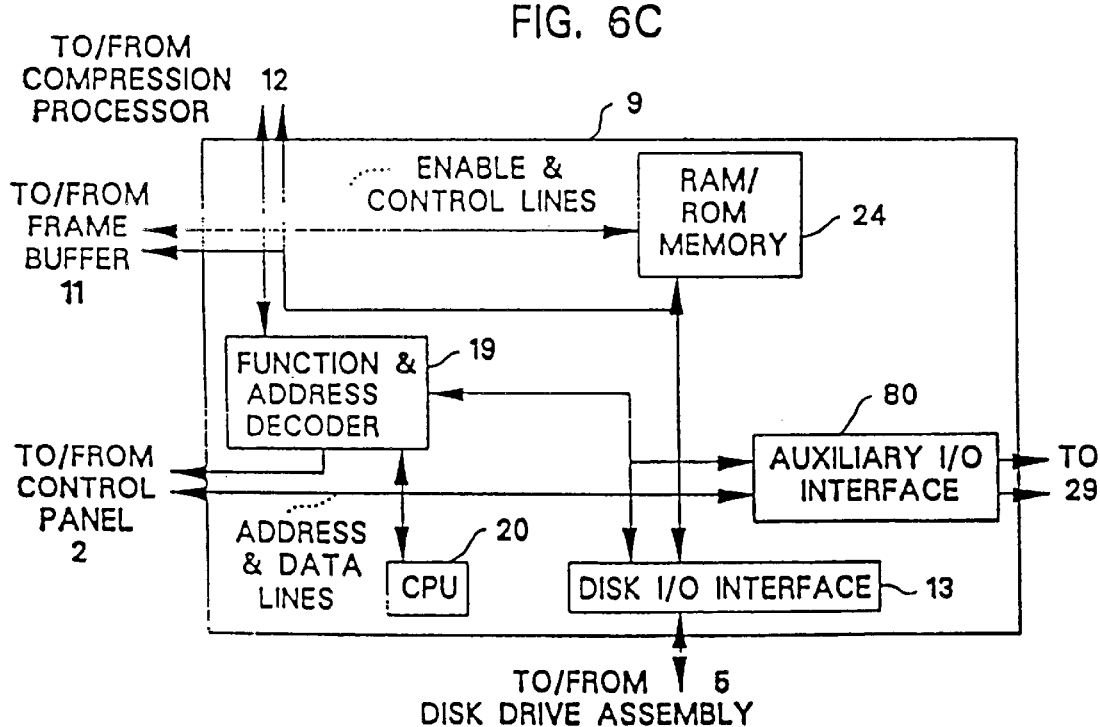
FIG. 7 is a simplified block diagram of the digital control unit in accordance with one aspect of the present invention.

FIG. 7 shows the digital control unit 9. The microprocessor 20 architecture here is typical to one familiar with the art. The frame buffet 11 (FIG. 5A) receives and stores the outputs of the pixel buffer 10 until a complete frame of image data is received. Then, the CPU 20, under software control, issues a control signal to the optics logic in the shutter and control circuitry 15 (FIG. 6) thus resetting those functions for future image recording. The full frame buffer 11, upon command from the CPU 20, transfers it's data into the compression processor 12 (FIG. 2) which performs thousands of levels of parallel pipeline processing on the image data. The compressed image frame is then written out to the mass memory RAM (Random Access Memory) 24 where it is temporarily stored until transferred to the disk drive assembly 5 via the disk I/O interface circuitry 13.

Figure 8:
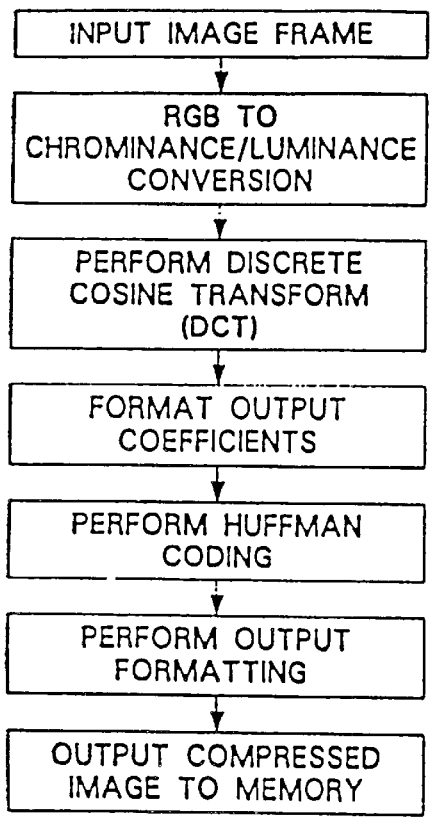
FIG. 8 is a flowchart showing the steps of the image compression algorithm in accordance with one aspect of the present invention.

Referring to FIG. 8, a flowchart shows the steps involved in the image compression process performed by the image compression processor 12 (FIG. 2) in accordance with the preferred embodiment of the present invention. The output of the frame buffer 11 is transferred into the input of the image compression processor 12 under the control of the digital control unit 9. As previously described, the setting of switch 14A (FIG. 6) is read by the CPU 20 (FIG. 7) to determine the image resolution quality desired. Depending on the operator selected setting of switch 14A, the unique digital word generated by the AND gate 60a–b (FIG. 6A) which is activated by the selected position of switch 14A is routed to image compression processor 12 via CPU 20 (FIG. 7) which selects for example a predetermined digital memory location containing the appropriate corresponding compression ratio parameters under program control. The compression processor uses this command value for example to establish the size of the covariance matrix and a threshold for acceptance for the variances produced by the Discrete Cosine Transformation (DCT) transform coefficients. Next, the digital image signals are converted from the RGB format previously discussed in connection with FIGS. 2, 5, and 6 into luminance and chrominance signals. The luminance and chrominance signals subsequently undergo a DCT. The cosine transformed signals are then quantized and are then processed for Huffman coding. The Huffman coded image signals are then formatted into a form that facilitates format processing into various PC compatible formats (GIFF, PICT2, etc.). For a more complete understanding of the image compression process reference may be made to I.E.E.E. Catalog No. EH0231-1, Library of Congress No. 85-60384 published by the I.E.E.E. Society dated 1985 and incorporated herein by reference.

Of the two traditional classes of image compression techniques, spatial coding and transform coding, transform coding techniques lend themselves well for this application due to computational simplicity. Transform coding techniques that provide good visual fidelity include: Karhunen-Loeve transform (KLT), Fourier, cosine, sine, and Hadamard. The KLT algorithm offers the best visual fidelity but suffers from serious computational complications due to extremely large matrix size. Several alternate algorithms that offer reasonable visual fidelity that are computationally feasible for this invention include the Fast Fourier Transform (FFT), Discrete Cosine Transform (DCT), and Discrete Sine Transform (DST). The DCT was adopted by the JPEG as the preferred algorithm due to computational simplicity and performance.

It should be noted that the Joint Photographic Experts Group (JPEG) (composed of experts from many companies including IBM, AT&T, Digital Equipment Corp, and INTEL) compression/decompression standard was developed in 1985 in response to the lack of interoperability between image and processing equipment due to numerous proprietary standards held by each manufacturer. The JPEG standard provides image compression effectively up to 75 times or greater depending on the visual fidelity desired. The JPEG standard is widely used in industry as an alternative to proprietary algorithms such as Intel's own proprietary standard called DVI which was initially developed by RCA before being sold to INTEL, the integrated Circuit manufacturer. INTEL offers it's own firmware compression processor incorporating their DVI standard delivering compression ratios in excessive of 100:1. However, a new international standard called MPEG is due to be announced in the 1991 time frame from the JPEG and should offer compression ratios of 275:1 and greater. In the preferred embodiment of the present invention, the JPEG standard is the preferred algorithm chosen with the incorporation of the the MPEG standard or other similar standard in the future when available commercially. An alternate embodiment of the present invention would be the incorporation of various proprietary compression algorithm standards such as DVI.

The compression/decompression algorithm firmware implementation of the JPEG algorithm is available commercially from various sources including C-Cube, Electronics for Imaging, Storm Technology, Burr-Brown, Spectral Innovations Inc., INTEL, and others. The implementation of this algorithm for the present invention may incorporate the integrated circuit set commercially available from C-Cube. Their four chip ASIC JPEG algorithm implementation is performed in three basic steps: first, the image is divided into 8-by-8 pixel squares and applies a discrete cosine transform (DCT) to each square resulting in 64 frequency values; second, these frequencies are put through a quantization algorithm to eliminate unimportant frequencies; third, the remaining values are run through a Huffman coding scheme to encode the most frequently occurring values using the fewest bits. A compatible software implementation of the JPEG algorithm is available commercially from Aladdin Systems, Radius Inc., Kodak, and others.

Those skilled in the art will be familiar with the process and the commercially available software and firmware chipsets that are currently available on the market. The present invention incorporates both available firmware chipsets in the camera and software for use in the PC for decompression. The decompression algorithm can be written onto the camera's diskette 50 prior to any image data recording. This allows the PC user to take the diskette 50 to a PC and directly incorporate the image data because the image file selected by the user is automatically decompressed transparent to the user. The algorithm can be written onto an unused track 52 or sector combination on the diskette as shown on FIG. 2A. Alternatively, the decompression algorithm can be loaded onto a PC before inserting a diskette 50 containing compressed image data. In the latter embodiment the resolution and mode values 54 and 55 (FIG. 2A.) for each representative image would be read from diskette 50 in order to appropriately control the selection and activation of the appropriate corresponding decompression algorithm.

As shown in FIG. 7, the output of the image compression processor 12 is routed to the RAM memory 24 where the compressed image is formatted for either the PICT II or GIFF format depending on the setting of format switch 17 (FIG. 6). It should be noted that a large number of image formats for PCs exist. PICT and GIFF are the most common for the Apple and IBM PC's and are therefore ihe preferred formats for the present invention although other formats can be easily incorporated into the design by changing the software format routines. These software image formats are commercially available from many sources most notably Apple computers for PICT and IBM for GIFF. An example of the PICT format is pictorially shown in FIG. 6B as will be familiar to those skilled in the computer arts. Once formatting is complete, the formatted image data is transferred to the disk I/O interface 13 for transfer to the magnetic recording diskette 50.

Figure 10:
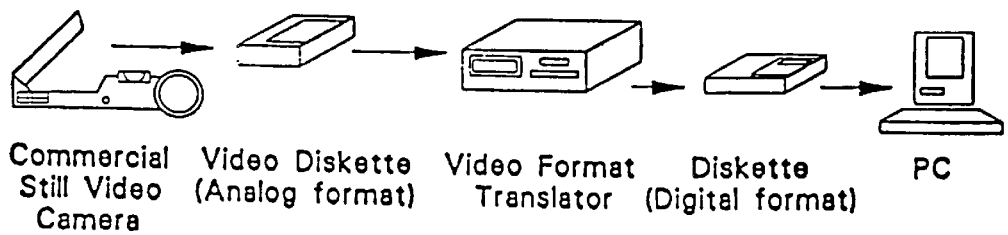
FIG. 10 is a block diagram illustrating the operation of a translator device in accordance with one aspect of the present invention.
Figure 9:
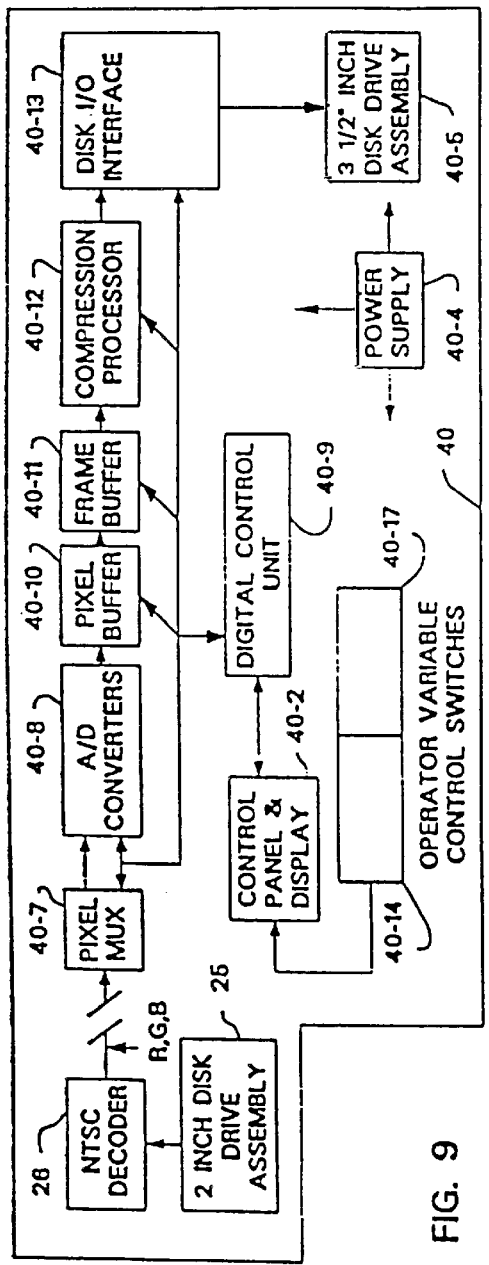
FIG. 9 is a block diagram of a video format translator device in accordance with one aspect of the present invention.

FIG. 9 and FIG. 10 illustrate the preferred embodiment of the video format translator device in accordance with another aspect of this invention that converts other still video camera formats for example on two inch video diskette to this invention's selectable PC compatible digital format. The general concept of operation is shown in FIG. 10. In FIG. 9 correspond parts and subassemblies in translator 40 are shown with like numbers corresponding to FIG. 2 and 6 having a 40 hyphenation prefix designation and such parts and subassemblies perform similar functions to those described above with reference to FIGS. 2 and 6. Referring again to FIG. 9, the translator 40 incorporates the same components utilized in the digital circuit card assembly which houses both the digital control unit 9 and optics processing circuits (pixel multiplexer 7, A/D 8, etc. 10–13). The major difference is that the CCD array 1 is replaced with an input disk drive 25, for example a two inch (2") video disk drive assembly, and an NTSC video format decoder 26 which converts the composite video signal to an RGB format for processing as described previously.

Figure 11:
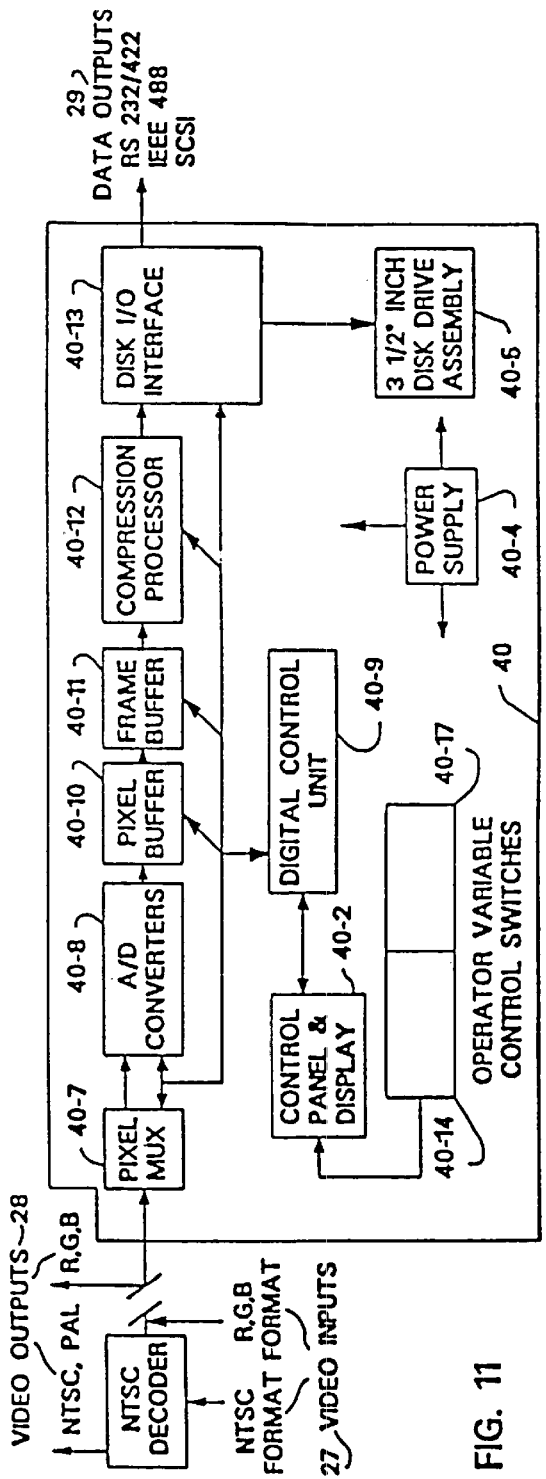
FIG. 11 is an alternative embodiment of the video format translator in accordance with another aspect of the present invention showing additional video inputs and data outputs.

FIG. 11. displays an alternate embodiment of the video format translator device 40 of the present invention that shows optional inputs 27 and outputs 28 and 29. The exact same circuitry is utilized that was used for the translator device 40 as shown in FIG. 9 except that inputs 27 for either an NTSC/PAL format or RGB format video signal is provided. This allows video signals from other sources such as a cable TV, CAMCORDER, or other video signal source to be digitized and archived in a PC compatible format. Also, provisions for video output jacks 28 are made to allow either viewing of the image/video source prior to or during image recording. Finally, provisions are made to provide a data output 29 to allow connection to other PC peripherals such as a communications modem, larger/smaller disk drive assembly, optical disk, specialty display or signal processor/analyzer. Either a standard serial, parallel, or Small Computer Standard Interface (SCSI) data port can be readily connected to the auxiliary I/O interface 80.

Figure 12:
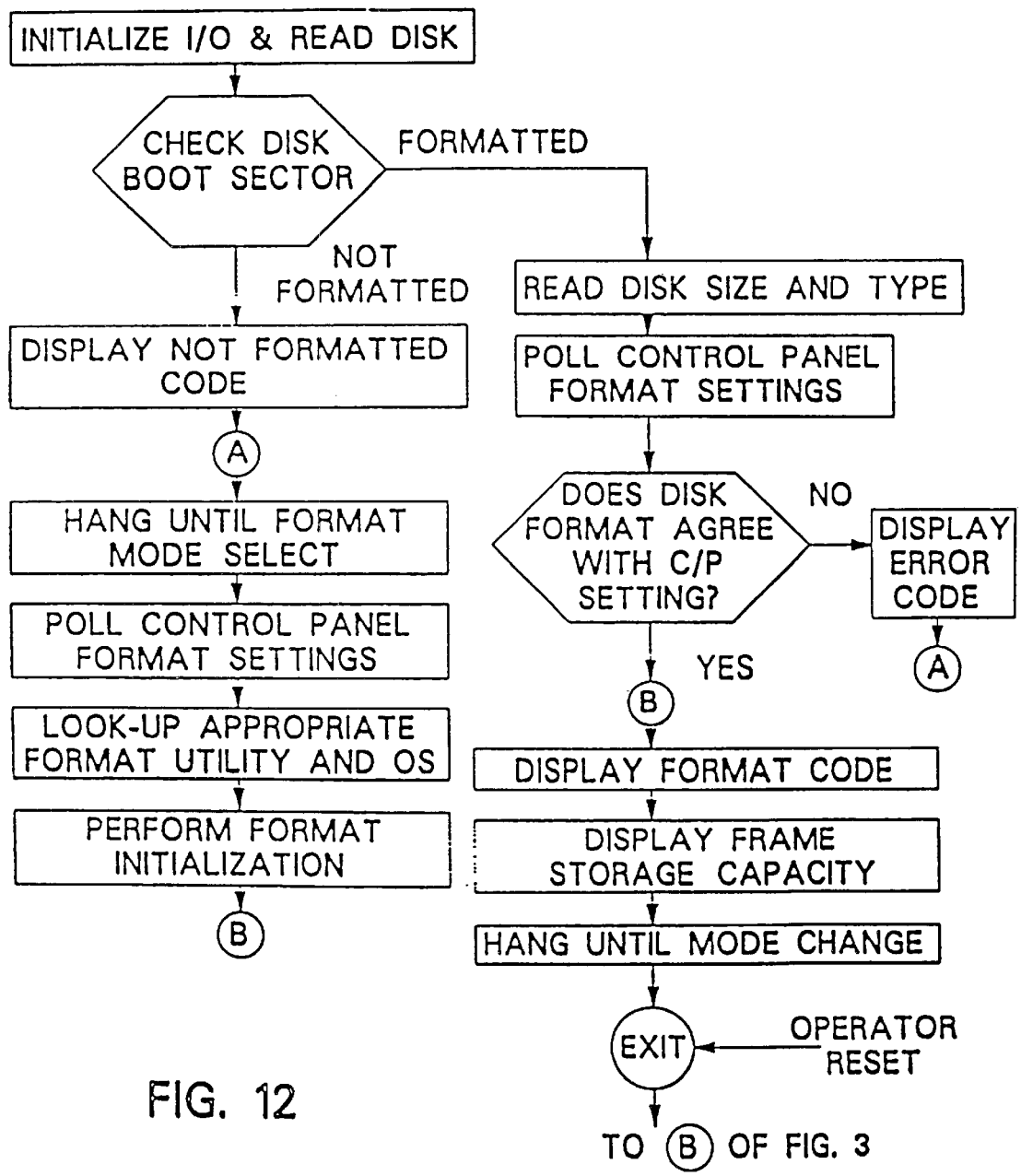
FIG. 12 is an alternate embodiment of the invention showing an optional diskette format utility flowchart.

FIG. 12 depicts an alternate feature of an embodiment of the present invention that shows how an inserted diskette 50 that is either unformatted or formatted for a undesired (e.g., not corresponding to the setting of switch 17—FIG. 6) PC configuration would be automatically properly formatted for use with a camera in accordance with another aspect of this invention. This capability allows the user of this invention to forego the requirement to pre-format the storage medium (diskette) on a PC prior to using it in the camera operated in accordance with the present invention. With reference to FIG. 3 the power-on sequence process would result in an abnormal diskette format error if the format of an inserted diskette 50 did not correspond to the operator selected format switch 17 (FIG. 6). In accordance with the automatic diskette format option, CPU 20 of digital control unit 9 in response to the abnormal diskette format error would initiate the diskette format process illustrated in FIG. 12. Upon completion of the diskette format process illustrated in FIG. 12, the power-on sequence illustrated in FIG. 3 would continue from step B.

Figure 14A:
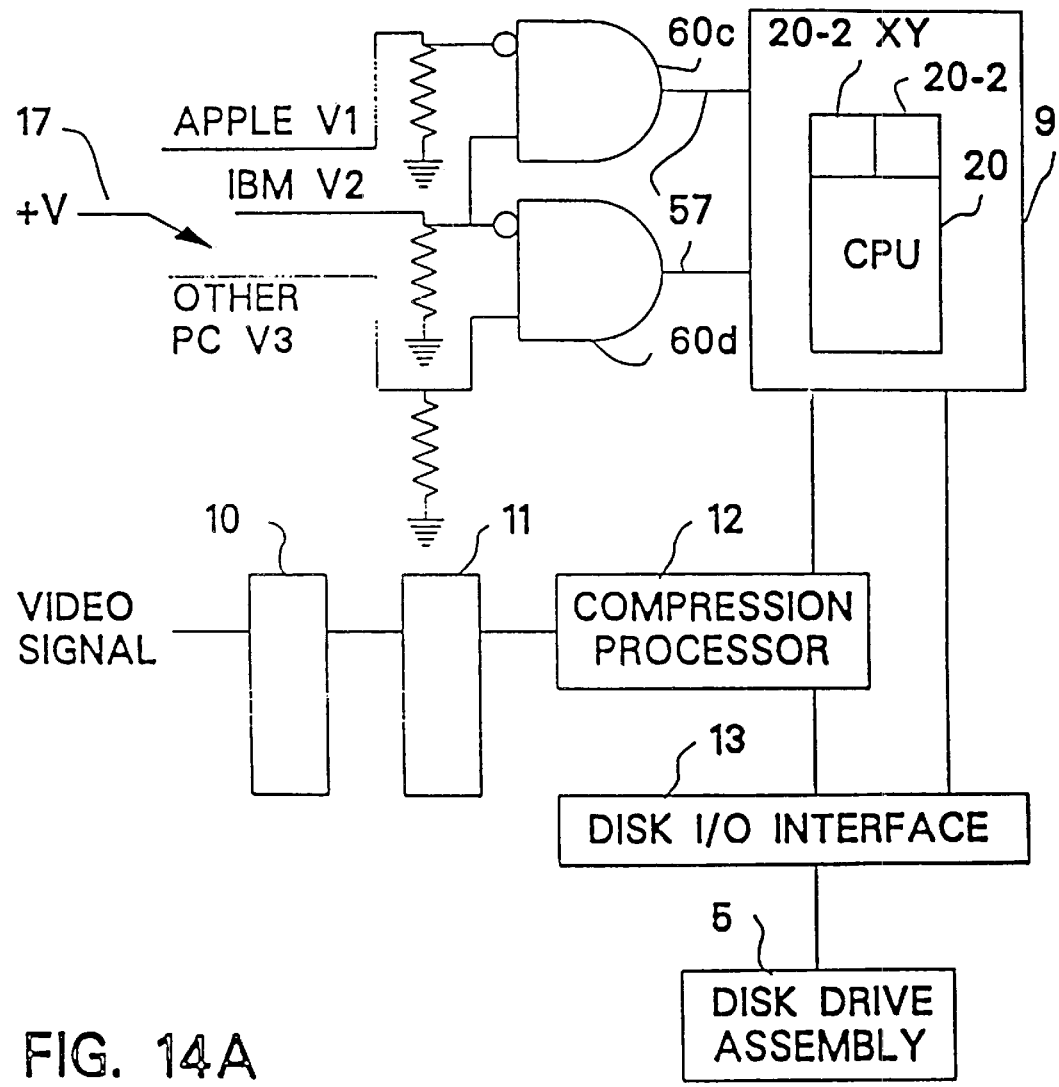
FIG. 14A is a block diagram of an embodiment of the format select logic in accordance with one aspect of the present invention.
Figure 14B:
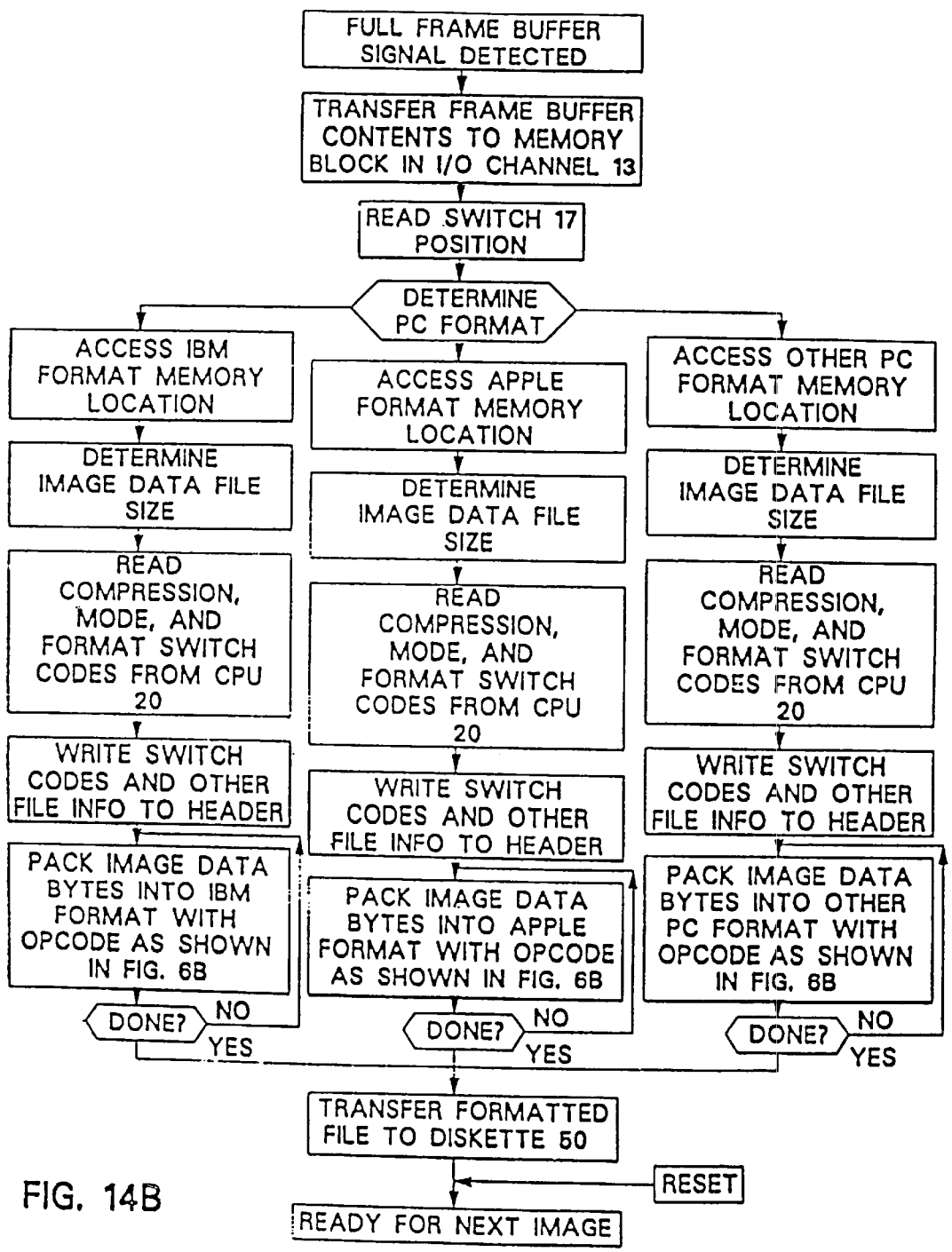
FIG. 14B is a flow diagram illustrating the steps of the format selection logic operations.

Referring now to FIG. 14A, there is shown a schematic block diagram of the format selection logic in accordance with another aspect of the present invention. During the power-on sequence as described in connection with FIGS. 3 and 12, processor 20 of control unit 9 initiates a format selection switch sample and test routine as more fully described in the flow diagram illustrated in FIG. 14B. Switch 17 is illustrated in FIG. 14A in the Apple PC position and logic level v1 is applied as inputs to logic gates 60c and 60d. As illustrated in FIG. 2A, the format signals 57 for the Apple PC format is a logic "zero" and conversely the format signal or mag 57 if the format switch 17 were in the IBM ?C or other computer type position would be a logic "one" and "two" respectively. In response to the logic "zero" indicating Apple PC format, processor 20 accesses a unique memory location XY of format memory 20-2 which for example may comprise any random access memory with two megabytes storage capacity. The data format for the operator selectable predetermined number of computer architectures, similar in content and arrangement to those illustrated in FIG. 6B for an Apple PC would be stored in memory 20-2 which would be addressed in response to the other operator selectable position of switch 17 to generate the other unique codes 57 as shown in FIG. 2A. Processor 20 in response to a stored format subroutine more particularly shown in FIG. 14B contains the allocation of data memory addresses in disk input/output interface unit 13 in accordance with the picture image file format as illustrated in FIG. 6B. Thus the digital video data information signals generated by compression processor 12 are appropriately formatted and stored in memory storage disk drive 5 to insure compatibility with the format selected by the operator by selectively positioning switch 17.

Those skilled in the art will recognize the many alterations, additions or changes of the preferred embodiment may be made without departing from the scope of the following claims.

What is claimed is:

1. In a digital camera including a memory element for storing digitized image data, the improvement comprising:

memory formatting means for formatting the memory element for use with an information handling system utilizing the same memory element format; and means for selecting a memory element format used In formatting the memory element from one of a plurality of different memory element formats.

2. In a digital camera including a memory element for storing digitized image data, the improvement comprising:

means for checking a format of the memory element for agreement with a specific format;

means for formatting the memory element whenever agreement with the specific format is not found by the means for checking; and means for selecting a specific format from one of a plurality of different specific formats.

3. In a digital camera including a removably coupled memory element for storing digitized image data, the improvement comprising;

means for checking a format of the memory element for agreement with a particular format; and means for selecting a particular format from one of a plurality of different memory element formats.

4. In a digital camera including a removably coupled memory element for storing digitized Image data, the improvement comprising:

memory formatting means for formatting the memory element for use with an information handling system utilizing the same memory element format; and means for selecting a memory element format used in formatting the memory element from one of a plurality of different memory element formats.

5. For use in a digital camera utilizing an IBM compatible memory format, a method for changing the format of a digital storage medium formatted in an Apple compatible memory format to the IBM compatible memory format, comprising:

checking in the camera a boot area of the storage medium to determine if the storage medium Is formatted in the IBM compatible memory format;

providing a format error indication to an operator of the camera if the checking determines that the storage medium Is not formatted in the IBM compatible memory format; and formatting the storage medium in the camera in the IBM compatible memory format in response to an operator control of the camera.

6. A method as in claim 5, wherein the storage medium is removably coupled to the camera.

7. In a digital camera including a digital storage medium, the storage medium formatted for use with a first information handling system utilizing an Apple compatible memory format, the improvement comprising;

a control unit for formatting the storage medium for use with a second information handling system utilizing an IBM compatible memory format.

8. In a digital camera including a digital storage medium, the storage medium formatted for use with a first information handling system utilizing an IBM compatible memory format, the improvement comprising:

a control unit for formatting the storage medium for use with a second information handling system utilizing an Apple compatible memory format.

9. In a digital camera utilizing an IBM compatible memory format, the improvement comprising:

a controller operative to change the format of a digital storage medium from an Apple compatible memory format to the IBM compatible memory format.

10. A digital camera, comprising:

an assembly operative to receive a digital storage medium, the storage medium having a boot area including information identifying an Apple compatible memory format of the storage medium; and a control unit operative to (a) check the boot area, and (b) format the storage medium in an IBM compatible memory format for use with the camera.

11. For use in a digital camera, a method for changing the format of a digital storage medium from an Apple compatible memory format to an IBM compatible memory format, the method comprising:

determining in the camera if the storage medium is formatted in the IBM compatible memory format; and formatting the storage medium in the camera in the IBM compatible memory format.

12. A process for use in a digital camera utilizing an IBM compatible memory format, comprising:

coupling a removable digital storage medium with the camera, the storage medium formatted in one of a plurality of memory formats;

determining in the camera if the storage medium is formatted in the IBM compatible memory format; and formatting the storage medium In the camera in the IBM compatible memory format.

* * * * *

UNITED STATES PATENT AND TRADEMARK OFFICE
CERTIFICATE OF CORRECTION

PATENT NO. : 6,496,222 B1
DATED : December 17, 2002
INVENTOR(S) : Marc K. Roberts et al.

It is certified that error appears in the above-identified patent and that said Letters Patent is hereby corrected as shown below:

Title page, Item [54] and Column 1, lines 1 and 2,
Title should be -- DIGITAL CAMERA HAVING MEMORY FORMATTING METHOD AND APPARATUS --.
Item [56], References Cited, OTHER PUBLICATIONS, delete the second occurrence of: "Camera Uses E2 PROM Film", Electronic Engineering Times, at 45 (Apr. 10, 1989), Miyoko Sakurai. "Picture Coding For Digital Still Camera", Toshiba Review, vol. 45, No. 8, at 635 and 638 (1990), Sasaki (no translation).
Citation should be -- Thermovision 800 Series Burst Recording Unit--Burst Recording Unit, by Agema Infrared Systems 1988 --.

Column 1,
Line 45, "such-as" should be -- such as --.
Line 52, after "following" insert a colon -- : --.
Line 66, "ROB" should be -- RGB --.

Column 2,
Line 21, after "invention" delete "is" (second occurrence).
Line 31, after "invention" insert -- is --.
Line 38, after "invention" delete "is" (second occurrence).
Line 57, "thru" should be -- through --.

Column 3,
Line 1, delete "of the" (second occurrence).
Line 63, "principals" should be -- principles --.

Column 4,
Line 20, "An-alternate" should be -- An alternate --.
Line 28, after "art" insert a period -- . --.

Column 5,
Line 61, "(MDI)" should be -- (MIDI) --.

UNITED STATES PATENT AND TRADEMARK OFFICE
CERTIFICATE OF CORRECTION

PATENT NO. : 6,496,222 B1
DATED : December 17, 2002
INVENTOR(S) : Marc K. Roberts et al.

It is certified that error appears in the above-identified patent and that said Letters Patent is hereby corrected as shown below:

Column 6,
Line 34, after "FIG. 3" delete the period and semi-colon ".;" and insert a comma -- , --.
Line 39, "power-one" should be -- power-on --.

Column 7,
Line 6, after "FIG. 5" delete the semi-colon ";" and insert a comma -- , --.
Line 21, "(MZ" should be -- (MHZ) --.
Line 56, "AID" should be -- A/D --.

Column 9,
Line 1, "if" should be -- in --.
Line 12, "buffet" should be -- buffer --.
Line 18, "it's" should be -- its --.

Column 10,
Line 18, "it's" should be -- its --.
Line 20, "excessive" should be -- excess --.
Line 26, delete "the" (first occurrence).
Line 64, after "2A" delete the period ".".

Column 11,
Line 7, "ihe" should be -- the --.
Line 24, "correspond" should be -- corresponding --.
Line 25, "FIG." should be -- FIGS. --.
Line 38, after "FIG. 11" delete the period ".".
Line 58, "a" should be -- an --.

UNITED STATES PATENT AND TRADEMARK OFFICE
CERTIFICATE OF CORRECTION

PATENT NO.    : 6,496,222 B1
DATED         : December 17, 2002
INVENTOR(S)   : Marc K. Roberts et al.

It is certified that error appears in the above-identified patent and that said Letters Patent is hereby corrected as shown below:

Column 12,
Line 20, "mag" should be -- tag --.
Line 20, "?C" should be -- PC --.
Line 42, "the" should be -- that -- (second occurrence).
Line 53, "In" should be -- in --.

Column 13,
Line 6, "Image" should be -- image --.
Line 21, "Is" should be -- is --.
Line 25, "Is" should be -- is -- .

Column 14,
Line 37, "In" should be -- in --.

Signed and Sealed this

Twelfth Day of August, 2003

JAMES E. ROGAN
*Director of the United States Patent and Trademark Office*